Aug. 23, 1949.  G. H. MERRICK  2,479,760
TRACTION DEVICE
Filed Oct. 19, 1948
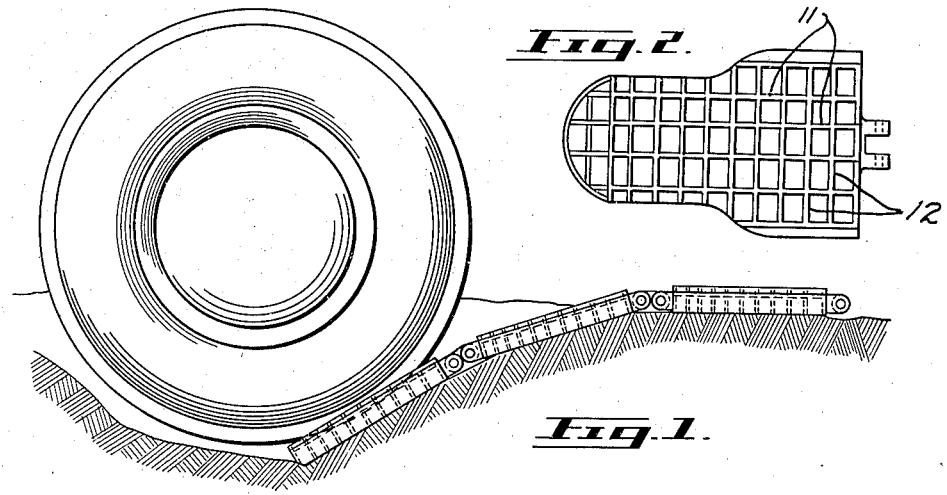
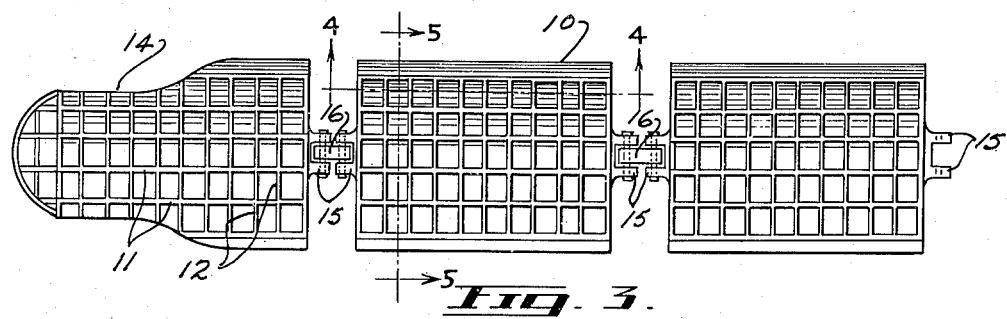
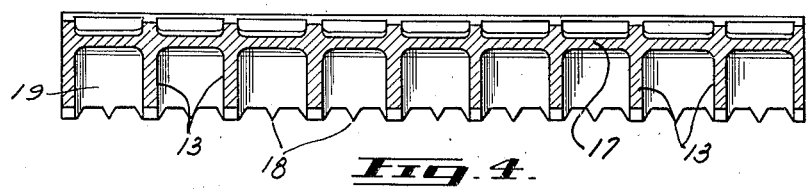
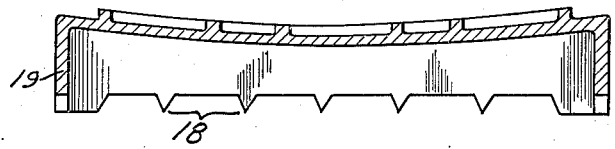
INVENTOR.
George H. Merrick
BY
Ralph Burch
Attorney Patented Aug. 23, 1949

2,479,760

UNITED STATES PATENT OFFICE 2,479,760

TRACTION DEVICE

George Harold Merrick, Ottawa, Ontario, Canada

Application October 19, 1948, Serial No. 55,343

3 Claims. (Cl. 238—14)

This invention relates to improvements in traction device and more particularly a traction track which is light, durable and easily stored in the luggage compartment of a motor vehicle.

Broadly the invention consists of a traction track which is easily inserted ahead of the vehicle wheels to increase the traction when the automobile becomes stuck in the mud or on an icy or slippery surface. The device is made of a plurality of sections hingedly secured to each other and the constructional details and arrangements are such that a plurality of sections may easily be folded and stored in the luggage compartment of the vehicle.

The sections are so arranged that any number may be secured together. This feature will be particularly appreciable in the case of front wheel drive vehicles.

The primary object of the invention is therefore to provide ready traction for vehicles for extricating same from a mud hole or an icy surface without the assistance of conventional chains.

Another important object is to provide additional traction which may be easily placed ahead or beneath the wheels of a vehicle and which is easily stored in the luggage compartment thereof.

Still a further object is to provide lugs at each extremity of the device so that any number of sections may be secured together.

Other apparent objects are the provisions of an article of the character set forth which is light in weight, easy to use, foldable into a comparatively small bundle and inexpensive to produce.

With these and other objects that may appear while the description proceeds, the invention consists in the novel arrangement of cooperating elements as hereinafter more specifically set forth, claimed and shown in the accompanying drawing, forming part of this application and in which:

Fig. 1 is a side elevational view showing the device in operation.

Fig. 2 is a plan view of the first section;

Fig. 3 is a plan view of the device constructed in accordance with this invention;

Fig. 4 is a section taken along lines 4—4 of Figure 3.

Fig. 5 is a section taken along line 5—5 of Figure 3.

Referring more in detail to the drawing in which similar reference characters designate corresponding parts throughout the several views, it will be seen the invention consists of a rectangular plate 10 formed with a plurality of longitudinal ribs 11 and transversal ribs 12 on the top surface while the underside is formed with a plurality of evenly spaced apart parallel transversal ribs 13. Longitudinally, the device presents a plane surface, as shown in Figure 4 while transversely it is curved as shown in Figure 5 of the drawing.

The front or first section is formed with ribs similar to the other sections except that the front extremity thereof is narrower at 14 and extends in the form of a lip with a rounded front extremity. This particular shape for the front section will facilitate the insertion of the device beneath the tire of a vehicle.

At the rear of the front section and at the front and rear of each subsequent section are formed a pair of brackets 15 for the purpose of securing two adjacent sections by means of a link 16 pivotally secured to the brackets 15.

The ribs 13, formed on the underface of the sections are substantially deeper than the ribs formed on the upper surface thereof. The larger ribs will provide traction between the road surface and the device while the smaller surface ribs 11 and 12 are sufficient to provide ample traction between the device and the vehicle wheel. It is to be noted that the total area of the device is covered by a wall 17 so that it will not tend to sink in soft mud or snow.

The lower edges of the ribs 13 are formed with a plurality of sharp projections 18 which engage the road surface and provide positive traction for the device.

The lateral ribs 19 at the ends of the transverse ribs 13 are also formed with sharp projections 18 disposed medially between each transversal rib 13.

Since each section is secured to the adjacent section by means of a link 16, one section may easily be folded beneath the adjacent section. With this method of folding the sections, the bundle, when folded, will be sufficiently small to be stored in the luggage compartment and using comparatively little space.

As may be seen in Figure 3 of the drawing, each section, behind the first one are identical, so that any number of sections may be secured together.

It is believed from the foregoing taken in conjunction with the accompanying drawing that the advantages of the invention are apparent without further detailed description.

While the preferred embodiment has been disclosed, it is understood that minor changes in the construction and arrangement of cooperating elements may be resorted to within the scope of the appended claims without departing from the spirit of the invention.

I claim:

1. A traction track comprising a rectangular plate curved transversely to provide a concave upper face and convex under face, a series of longitudinal and transverse intersecting ribs formed integral with the upper face of said plate, and a series of spaced transverse ribs formed integral with the under face, the lower edges of said last mentioned ribs being disposed in a horizontal plane.

2. A traction track of the character described in claim 1 wherein the last mentioned transverse ribs are provided with projections along their lower edges.

3. A traction tract of the character described in claim 1 wherein the last mentioned transverse ribs are connected at their ends by lateral ribs.

GEORGE HAROLD MERRICK.

REFERENCES CITED

The following references are of record in the file of this patent:

UNITED STATES PATENTS

| Number | Name | Date |
| --- | --- | --- |
| 1,344,238 | Lavallee | June 22, 1920 |
| 1,373,042 | Workman | Mar. 29, 1921 |
| 1,400,478 | Deschamps | Dec. 13, 1921 |